Jan. 18, 1955   G. MANECKE   2,700,063
SOURCE OF CURRENT
Filed Jan. 26, 1953
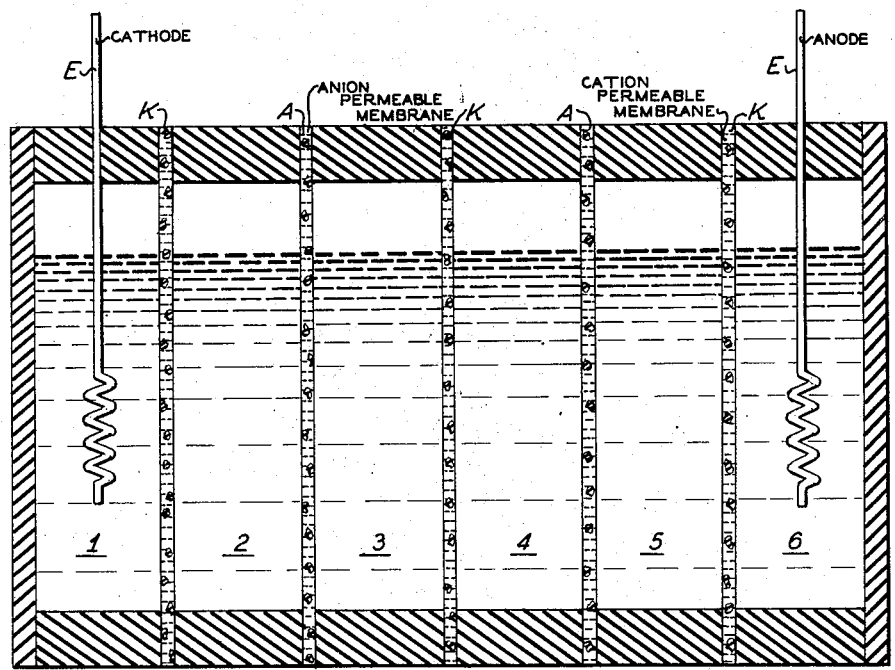
INVENTOR
GEORG MANECKE
BY
ATTORNEYS 2,700,063

SOURCE OF CURRENT

Georg Manecke, Berlin-Wilmersdorf, Germany

Application January 26, 1953, Serial No. 333,163

Claims priority, application Germany January 25, 1952

10 Claims. (Cl. 136—93)

The invention relates to an apparatus to produce a source of current characterized by the fact that alternately cation- and anion-permeable membranes or partition-walls, preferably prepared from or with cation- or anion-exchanging resins, are connected in series. The cells, which are separated by the membranes contain alternately concentrated and dilute electrolytic solutions.

In this process, membrane potentials develop which are connected in series by the electrolytic solutions, which are between these membranes. Strong or dilute electrolytic solutions in the respective cells are either filled at the beginning or they can be produced by first filling all the cells with a solution of the same concentration and passing a direct current through the whole battery. Because of the different permeability of the membranes in the cells, alternately strong and dilute solutions are produced.

The invention will be more thoroughly discussed in the following when considered with the accompanying drawing which shows schematically an example of operation of the invention.

Alternately cation exchange (K) and anion exchange (A) membranes, prepared of ion exchange resins are built up in a battery maintaining them at equal distances with the aid of distance pieces. The composition is as follows: at both ends either both the membranes are cation exchangers or anion exchangers or one of the end membranes is a cation exchanger and the other is an anion exchanger.

The entire vessel as well as the distance pieces are prepared from any electrically insulating and waterproof material for example glass, plastics, etc.

The vessel is made watertight with the aid of elastic packing materials by special cements or adhesive substances. The vessel and the distance pieces can be made of one piece. The whole battery can be held together by bolts.

The cells between the membranes are alternately filled with 1 normal and 1/10-normal KCl-solution. The end cells 1 and 6 contain Ag/AgCl-electrodes (E) to conduct the current. One can also proceed in the manner that at first, e. g. 1/10 normal KCl-solution is filled into all of the cells. A direct current is passed through the battery due to the different permeability of the membranes and alternate concentration respectively with dilution of the solution. In this manner, one can load the membrane-accumulator.

Consider now cell 2, here the K-ions can migrate through the cation exchange membrane to the cathode and so also the Cl-ions through the anion exchange membrane to the anode. In this cell, the current will thus effect a dilution of the electrolyte. In the next cell 3, the anion, which is coming from the left side, cannot proceed further, and the cation, which is coming from the right side, also cannot proceed further. Thus a concentration of the solution will result.

After the passage of current, the cells 1, 3 and 5 will contain a concentrated electrolytic solution, and the cells 2, 4 and 6 a dilute solution.

The membranes or separating walls are produced from semi-permeable material, preferably of or with ion exchange resins. As electrolytes all inorganic or organic salts, acids or bases can be applied, e. g. KCl, NaCl, HCl, NaOH, etc. These substances are dissolved in water or as mixtures. The electrolyte can be the same in all cells or different electrolytes can be applied. The electrodes can be made of metal or carbon. Also, secondary electrodes can be used, e. g. Ag/AgCl electrodes if the electrolytes are chlorides.

In order to obtain a constant voltage, the solutions can be stirred mechanically or a gas can be blown through the solution. In order to raise the capacity, the saturated solutions of the concentrated cells can contain surplus undissolved electrolyte or to the cells of lower concentration, some precipitating or adsorbing agent for the corresponding ions can be added.

The ion exchange membranes can have a corrugated shape in order to exchange the surface.

It is possible to thicken the electrolytic solutions by mechanical or chemical means, whereby also solid electrolyte can be added to the concentrated cells. The capacity can also be raised by passing through the corresponding cells from outside containers concentrated and diluted solutions whereby the surplus can be drawn off.

A constant current can be obtained by continuous flow of the solutions through the cells. The flow solutions can be reused by concentration through evaporation.

I claim:

1. Apparatus to produce a source of current comprising a plurality of cells with alternate cation- and anion permeable membranes as partition walls, consisting at least partly of ion exchange resins and connected in series, the cells containing alternately electrolytic solutions of higher and lower concentrations.

2. Apparatus to produce a source of current according to claim 1, in which at first all cells contain a solution of the same concentration, and by passing a direct current therethrough the concentrations are changed and an electric tension is generated.

3. Apparatus to produce a source of current according to claim 1, in which the partition walls between the electrolytic solutions consist of semi-permeable membranes.

4. Apparatus to produce a source of current according to claim 1, in which the electrolytic solutions consist of inorganic and organic salts, acids and bases selected from the group consisting of NaCl, KCl, $H_2SO_4$, HCl, NaOH, KOH which are dissolved in water.

5. Apparatus to produce a source of current according to claim 1, in which different cells contain different electrolytes.

6. Apparatus to produce a source of current according to claim 1, in which electrodes are provided consisting of metal and carbon.

7. Apparatus to produce a source of current, according to claim 1, in which a vessel and distance pieces are provided consisting of insulating material which is not permeable to water, acids and bases.

8. Apparatus to produce a source of current according to claim 1, in which the electrolytic solutions in the cells are stirred mechanically.

9. Apparatus to produce a source of current according to claim 1, in which the cells with the concentrated solution contain solid undissolved electrolyte.

10. Apparatus to produce a source of current according to claim 1, in which the cells with the less concentrated solution contain precipitating and adsorbing materials for the permeating ions.

References Cited in the file of this patent

UNITED STATES PATENTS

| Re. 11,893 | Hess et al. | Mar. 5, 1901 |
| 1,486,042 | Schuster | Mar. 4, 1924 |
| 2,607,809 | Pitzer | Aug. 19, 1952 |
| 2,636,851 | Juda et al. | Apr. 28, 1953 |